United States Patent
Frey et al.

[11] Patent Number: 5,977,652
[45] Date of Patent: Nov. 2, 1999

[54] DEVICE FOR SUPPLYING VOLTAGE IN A MOTOR VEHICLE INCLUDING TWO BATTERIES AND HAVING IMPROVED RELIABILITY

[75] Inventors: Wunibald Frey, Schwieberdingen; Hans Gegusch-Brunner, Ettlingen; Joachim Schenk, Hemmingen; Volker Breunig, Heilbronn-Neckargartach; Richard Schoettle, Muehlacker; Bernd Aupperle, Steinheim, all of Germany

[73] Assignee: Robert Bosch GmbH, Stuttgart, Germany

[21] Appl. No.: 08/983,072
[22] PCT Filed: Mar. 25, 1997
[86] PCT No.: PCT/DE97/00603
§ 371 Date: Jan. 12, 1998
§ 102(e) Date: Jan. 12, 1998
[87] PCT Pub. No.: WO98/02950
PCT Pub. Date: Jan. 22, 1998

[51] Int. Cl.⁶ .................................................. H02J 1/10
[52] U.S. Cl. ................... 307/10.1; 307/44; 307/64; 307/66; 320/104; 340/455
[58] Field of Search ...................... 307/9.1, 10.1, 307/10.6, 10.7, 10.8, 66, 64, 44; 180/65.1–65.8; 320/103, 104, DIG. 30, DIG. 31; 340/438, 455; 364/528.21, 528.31, 528.32

[56] References Cited

U.S. PATENT DOCUMENTS 5,525,891   6/1996   Meyer et al. ..................... 320/128

Primary Examiner—Albert W. Paladini
Attorney, Agent, or Firm—Michael J. Striker

[57] ABSTRACT

A two-battery on-board electrical system in a motor vehicle is disclosed, in which an on-board electrical system control unit is disposed between the batteries, and one battery is used primarily to supply the usual consumers while the other is used primarily to supply the starter. The on-board electrical system control unit 16 includes an on-board electrical system module, which performs the requisite reverse switching operations and has one further terminal, by on-board electrical system components required for starting an operation can be supplied with voltage. These on-board electrical system components are supplied at maximum priority, and if the supply battery is too greatly discharged are jointly supplied by both batteries, but it is nevertheless assured that during the starting process the other on-board electrical system components are not connected to the starter battery.

10 Claims, 4 Drawing Sheets

DEVICE FOR SUPPLYING VOLTAGE IN A MOTOR VEHICLE INCLUDING TWO BATTERIES AND HAVING IMPROVED RELIABILITY

BACKGROUND OF THE INVENTION

1. Field of the Invention

The invention relates to a device for the voltage supply in a motor vehicle and, more particularly, to a device for supplying voltage in a motor vehicle having two batteries.

2. Prior Art

Until now, the voltage supply in motor vehicles was typically done with the aid of a single battery charged by a generator. In modern motor vehicles with many electrical consumers, one battery is sometimes no longer sufficient for the voltage supply. To assure starting two separate batteries are used that are typically connected in parallel to one another. To assure that the two batteries are not cyclized at the same time and thus to prevent voltage drops that can occur during actuation of the starter at voltage-critical components, a charging/disconnection module is connected between the two batteries. This charging/disconnection device is provided in a device for voltage supply in a motor vehicle described in German Patent 41 38 943. During the starting process this module disconnects the battery associated with the starter from the rest of the on-board electrical system. Since the rated voltage of the battery assigned to the starter is somewhat lower than the rated voltage of the on-board electrical system battery, it is assured that the starter battery will be optimally charged at all times.

SUMMARY OF THE INVENTION

It is an object of the present invention to provide an improved circuit device for supplying voltage in a motor vehicle including two batteries and having improved reliability for vehicle operation even when both of the batteries are in a poorly charged state.

According to the invention the device for supplying voltage in a motor vehicle includes supply circuit means including a generator having an output voltage, a first battery connected electrically with the generator and at least one consumer connected electrically with the generator and the first battery;

starting circuit means including a starter and a second battery connected electrically with the starter;

operations-relevant electrical components necessary for continued operation of the motor vehicle including a voltage regulator connected electrically with the supply circuit means for regulation of the output voltage of the generator;

control means comprising a plurality of terminals including at least one terminal electrically connected to the starting circuit, at least one other terminal electrically connected to the supply circuit and at least one further terminal for electrical connection of the operations-relevant electrical components with the supply circuit or the starting circuit; and an on-board electrical system module including means for reverse switching between the terminals for electrically connecting and disconnecting the starting circuit and the second battery to the generator and the first battery of the supply circuit via the at least one terminal electrically connected to the starting circuit and the at least one other terminal electrically connected to the supply circuit and for electrically connecting and disconnecting the operations-relevant components with the supply circuit or the starting circuit via the at least one further terminal; and means for controlling the means for reverse switching between the terminals, preferably a microprocessor, so that the operations-relevant components are supplied with electrical power at a highest priority in relation to a supply of the at least one consumer for emergency operation of the motor vehicle when both batteries are in a substantially discharged or poorly charged state.

The device according to the invention for the voltage supply in a motor vehicle has the advantage that even when the batteries are in a poorly charged state it is assured that the vehicle can still be operated for a certain length of time, one that for instance suffices to drive to the next repair facility. This advantage is attained by employing an on-board electrical system control unit, which performs the connection and disconnection function between the two batteries and has one additional terminal by way of which the voltage supply can be assured for those electrical or electronic components that are absolutely necessary for vehicle operation. This additional terminal is supplied with voltage at maximum priority, with the aid of an advantageous feature of the charging/disconnection circuit, so that emergency operation is still possible even if the supply battery is largely discharged.

Further advantages of the invention are attained with the following features of preferred embodiments of the invention. It is especially advantageous that when a direct voltage converter is additionally used, which may be external, separate, or integrated into the on-board electrical system control unit and supplies the operation-relevant components, an adequately high voltage can be furnished even if both batteries are largely discharged. By using electronic analog switches and other direct voltage converters, a bidirectional reversing switch module can be created that is not vulnerable to malfunction and that operates especially reliably. Advantageously, the triggering of the various components is done with the aid of a controlling unit, such as a microprocessor.

BRIEF DESCRIPTION OF THE DRAWING

The objects, features and advantages of the invention will now be illustrated in more detail with the aid of the following description of the preferred embodiments, with reference to the accompanying figures. Specifically.

FIG. 1 shows a block diagram of a two battery on-board electrical system according to the invention.

FIG. 2 shows a first embodiment of a two battery on-board electrical system in module form.

FIG. 4 shows a two battery on-board electrical system using a reversing switch.

FIG. 5 shows a two battery on-board electrical system using field effect transistors.

FIG. 6 shows an embodiment of a two battery on-board electrical system using switch with a comparator and a relay.

FIG. 7 shows a two battery on-board electrical system with a combination analog switch and voltage converter.

FIG. 8 shows a two battery on-board electrical system with a voltage converter connected between to field effect transistors.

DESCRIPTION OF THE PREFERRED EMBODIMENTS

Figure 1:
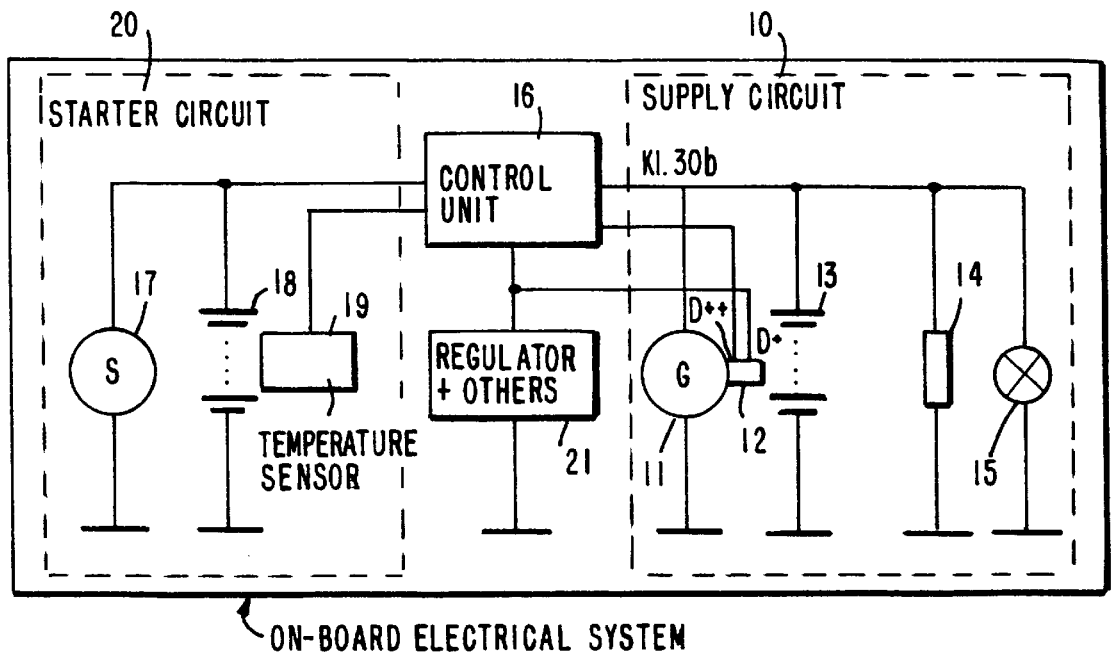
FIG. 1 shows a block circuit diagram of a two-battery on-board electrical system according to the invention.

In FIG. 1, a block circuit diagram of a two-battery on-board electrical system according to the invention is shown, which includes the following components in detail. A supply circuit 10, which comprises the generator 11 together with the voltage regular 12, the supply battery 13, and consumers 14 and 15. The components of the supply circuit 10 are connected to the on-board electrical system control unit 16 via a terminal Kl.30. The on-board electrical system control unit 16 is connected to the starter 17 and the starter battery 18 via a further terminal Kl.30a. The starter 17, and the starter battery 18 and a temperature sensor 19 that ascertains the temperature of the starter battery and furnishes it to the on-board electrical system control unit 16, from the starting circuit 20.

The on-board electrical system control unit 16 has one further terminal Kl.30b, which serves to supply components that are absolutely required for the starting and operation of the vehicle. In FIG. 1, these components are shown as a block 21. The relevant components that must be supplied with voltage absolutely, not only during typical operation but in emergency operation as well, can be summarized as starting and substitute operational components; these also include the regulator of the generator having the terminal D+. The generator regulator may also be supplied externally, for instance for generator excitation, via an additional DC/DC converter.

The various ends of the aforementioned components that are not connected to the on-board electrical system control unit are each connected to ground in the usual way. The embodiment of the on-board electrical system control unit and the circuit elements of the on-board electrical system control unit required for comprehension of the invention will be described in further detail in the subsequent drawings.

Figure 2:
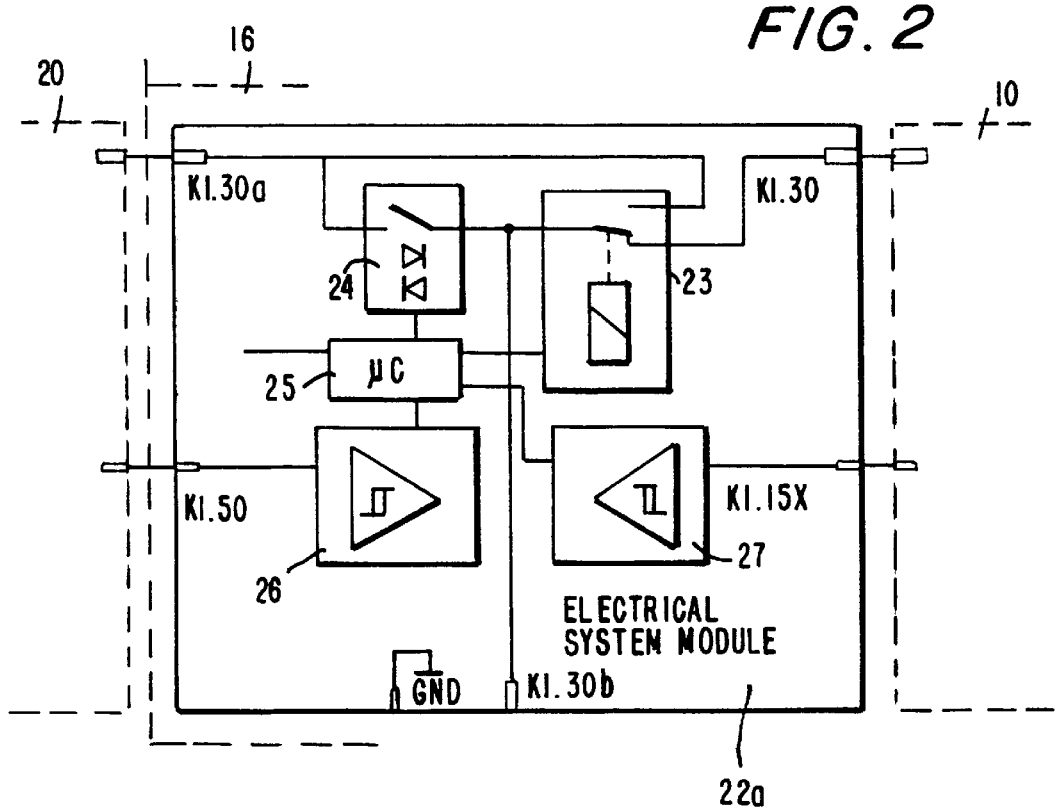
FIG. 2 shows a first on-board electrical system module and FIG. 3a second on-board electrical system module, which are part of the on-board electrical system control unit.

FIG. 2 shows a first embodiment of an on-board electrical system module 22a in the form of a block circuit diagram. This module 22a is a component of the on-board electrical system control unit 16 or is equivalent to this control unit. The on-board electrical system module of FIG. 2 has the terminals Kl.30 and Kl.30a, by which the on-board electrical system module can be supplied by the supply circuit 10 or starting circuit 20, and the terminal Kl.30b, by way of which the relevant components 21 can be supplied with voltage from the module. A reversing switch 23, such as a relay, and an electronic or electrical switch 24 are also present. Via the reversing switch 23 and the electronic switch 24, connections can be made or broken between the terminals Kl.30, Kl.30a and Kl.30b. Which of the connections are to be made and which are to be interrupted is determined with the aid of a controlling unit, for instance of a microcomputer 25. The controlling unit 25 in this process evaluates data supplied to it with the aid of other components. To that end, it is connected to all the components of the on-board electrical system module 22a, and these connections include triggering lines and/or data lines.

For triggering the electronic switch 24 and the reversing switch 23, special data are evaluated in the controlling unit. One of these data is whether the starter 17 is actuated or not. It is supplied to the on-board electrical system module 22a via the terminal Kl.50, and the evaluation is done in a threshold value switch, shown as block 26 in the exemplary embodiment. Naturally, block 26 may be a component of the controlling unit 25 or may be designed as a separate circuit; what is essential is that a signal appears at the output of block 26 that tells whether the starter is actuated or not. If the starter is actuated, then as a function of the output signal of block 26 the electronic switch 24 is triggered, whereupon the electronic switch 24 opens as soon as the starter is actuated. This is intended to assure that no voltage interruption is passed onward by the starting circuit 20 to the rest of the on-board electrical system.

Block 27 is a threshold value stage, to which external data, for instance from the ignition key, can be delivered via a terminal Kl.15X, which turns on the supply to the on-board electrical system control unit and may necessitate actuation of the electronic switch 24 or the reversing switch 23. Block 27 may also be designed as a separate circuit or may be integrated in the controlling unit 25.

With the on-board electrical system module according to the invention, a two-battery on-board electrical system can be constructed, in which the starting circuit and the supply circuit are at the same or a slightly different voltage, typically 12 V. This voltage is then also made available to the starting and substitute operation-relevant components 21. The individual reverse switching operations required for optimal voltage supply will be described below as well, in terms of the examples shown in the circuits of FIGS. 5–8. In principle, the triggering of the electronic switch and of the reversing switch 23 is effected such that operation-relevant consumers connectable to the terminal Kl.30b are still supplied reliably with voltage even if the batteries are in a poorly charged state, and a voltage break when the starter is actuated is averted, at least for those components.

Figure 3:
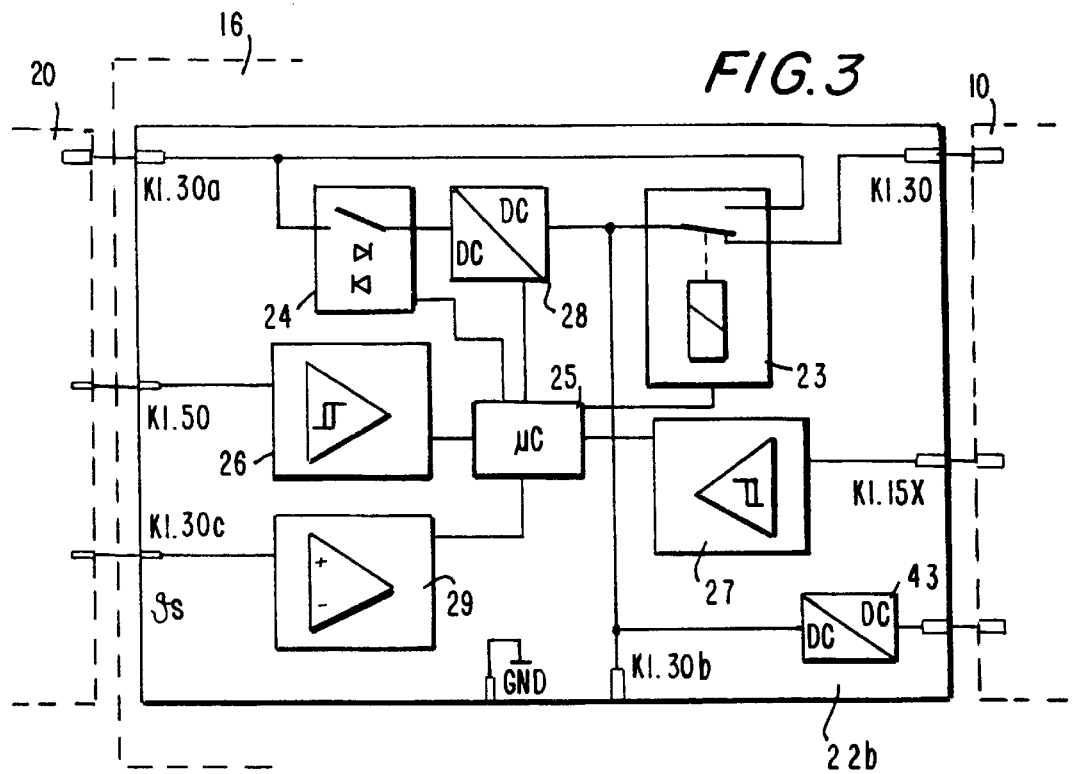
FIG. 3 shows an expanded two battery on-board electrical system.

In FIG. 3, an expanded on-board electrical system module 22b is shown in the form of a block circuit diagram. This module has the same terminals as the module of FIG. 2. Some of the other components also correspond to those of the module of FIG. 2. In addition, a DC/DC converter 28 is located between the electronic switch 24 and the reversing switch 23. The signal measured with the aid of the temperature sensor 18 and corresponding to the temperature of the starter battery is supplied via an additional terminal Kl.30c. This temperature is furnished to the controlling unit via a signal processing circuit 29. The DC/DC voltage converter 28 is regulated primarily as a function of this signal.

With the on-board electrical system module shown in FIG. 3, on the one hand the voltage at the starter battery 18 can be raised relatively to the voltage at the supply battery. Voltages of up to 17 V are possible at the starter battery; the actual magnitude of the voltage generated with the aid of the DC/DC converter depends on the temperature of the starting storage device, and the higher voltage is generated at low temperatures. For optimal charging of the starter battery, for a known temperature the charging voltage can be selected such that the charge is near the gasification limit. A short charging time is achieved by using a high-power voltage converter. The maximum starting power is thus guaranteed even at the lowest temperatures. Optionally, a voltage converter can be used that also works in the opposite direction and that processes the voltage furnished by the starter battery in such a way that the starting and substitute operating components can be supplied with the proper voltage they require; in that case, the reversing switch is embodied as merely a simple opener between Kl.30 and Kl.30b.

Both the on-board electrical system module shown in FIG. 2 and that shown in FIG. 3 can be realized in arbitrary form, such as in the form of logic, ASICs and/or with microprocessors, and can optionally be expanded with supplementary functions. A multi-channel embodiment of the on-board electrical system module is also possible. In the case of the on-board electrical system module shown in FIG. 2, an economical single-chip version with a limited charge current and minimum space requirement and weight can be used, so as to assure the disconnection function of the starting circuit and supply circuit and the reversal of the supply of the components for emergency starting and substitute operation of the vehicle.

In FIGS. 4–8, additional embodiments of the on-board electrical system modules 22c–g are shown, which can be built into or replace the on-board electrical system control units 16. Since their use in other two-voltage systems is also conceivable, the terminals in FIGS. 4–8 are designated as Kl.A, Kl.B and Kl.C.

Figure 4:
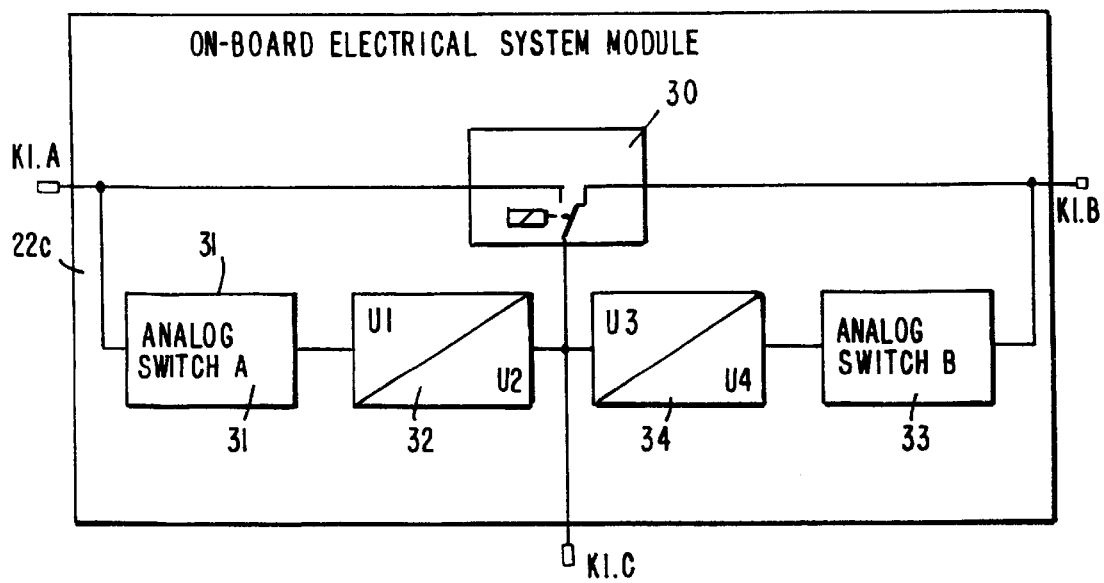
FIG. 4 shows a block circuit diagram of a generalized on-board electrical system module.

In the general on-board electrical system module 22c shown in FIG. 4, by means of a reversing switch 30 the terminal Kl.C can be connected selectively to terminal Kl.A or terminal Kl.B. An analog switch 31 and a voltage converter 32 with the voltages U1, U2 are located between terminal Kl.A and Kl.C. An analog switch 33 and a voltage converter 34 with voltages U3, U4 are connected between the terminal Kl.C and terminal Kl.B. With this arrangement, reverse switching can be done electromechanically with a reversing switch relay or two closer/opener relays, or electronically, for instance with analog switches. With this module, the following basic functions can be achieved:

1. Reverse switching of terminal Kl.C from terminal Kl.A to terminal Kl.B.

The loads applied to terminal Kl.C can be supplied either from the terminal Kl.B or, if the relay is activated, from terminal Kl.A. To avoid a supply collapse and to relieve the relay contacts, one or more analog switches 31, 33 can be switched through during the reverse switching.

With the arrangement of FIG. 3, a unidirectional or bidirectional open- or closed-loop control of the flow of current can also be achieved between the various terminals Kl.A and Kl.B, Kl.A and Kl.C, Kl.B and Kl.C, and Kl.C and Kl.A. A unidirectional or bidirectional voltage conversion between Kl.A and Kl.B, Kl.A and Kl.C, and Kl.B and Kl.C is also possible. The prerequisite is that suitable voltage converters be used, these being designed such that the ends of the voltage converters communicating with Kl.C always furnish a voltage of 12 V.

The on-board electrical system module shown in FIG. 4 may be used in a two-battery on-board electrical system of FIG. 1. In that case, the battery 18, which is used only to supply the starter 17 or to supply a further, special current circuit, such as for high-current loads, for example an electrical catalytic converter, windshield heater, and the like, is connected to the terminal Kl.A. The terminal Kl.B is connected to the other on-board electrical system components, such as the generator 11, supply battery 13, and non-starting-specific consumers 14, 15, as well as other components. Via the terminal Kl.C, starting-specific on-board electrical system components, or components whose supply is absolutely necessary for driving operation can be connected. These components for instance include the engine electrical system, electric fuel pumps, generator excitation, and so forth.

If in the "ignition on" operating state a voltage threshold at terminal Kl.B, for example, is undershot, then a starting process is taking place and the reversing switch 30 is activated. As a result all the components necessary for starting are switched over to the terminal Kl.A. As a result, starting is possible even if the supply battery is empty, as long as it is assured that the starter battery 18 is always sufficiently charged. On the condition that the starter battery 18 is loaded only during starting and subsequently is recharged as fast as possible, an adequate charging state is assured. An adequate charging state can also be assured given an adequately high voltage in the on-board electrical system current network on the generator side, by providing that the analog switch 31 switches through only whenever this generator voltage is greater than the starting circuit voltage (diode function with only slight voltage drop). If rapid charging is to be assured, then either the selected generator 11 must be sufficiently powerful (to assure an adequately high charging voltage), or it must be dimensioned adequately, or else a voltage converter, such as a DC/DC converter, must be provided, which enables charging of the starter battery at the terminal Kl.A in every vehicle operation situation and when the vehicle is stopped.

Figure 5:
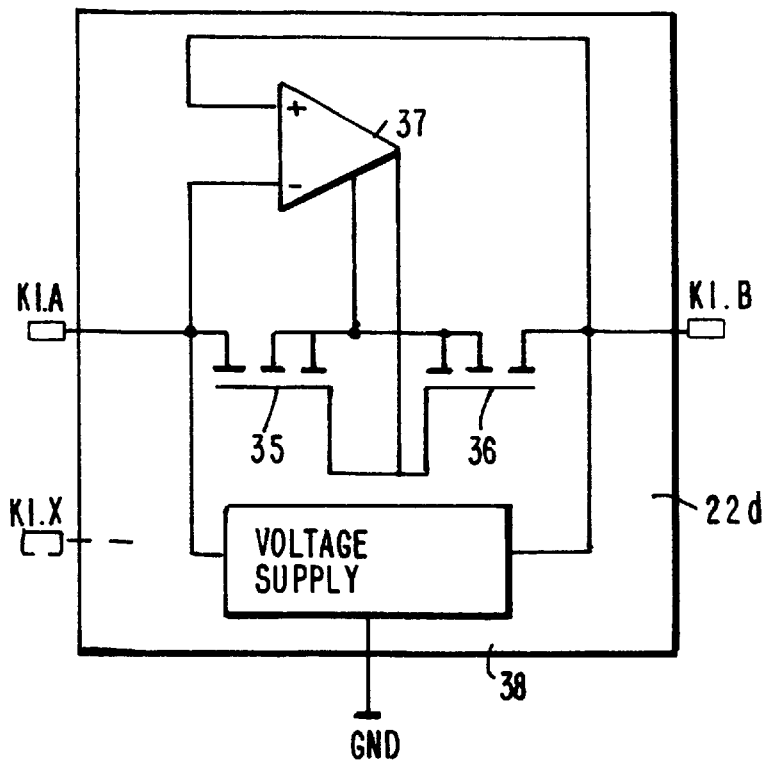
FIGS. 5, 6, 7 and 8 show features of an on-board electrical system module, first with an on-board electrical system module constructed with a connecting switch in the form of an analog switch, and then an on-board electrical system module with a reverse switching function, and an on-board electrical system module with a combination of an analog switch and a voltage converter.

In FIG. 5 an additional embodiment of an on-board electrical system module 22d is shown. This variant includes an electronic switch that can connect the terminals Kl.A and Kl.B to one another. This connection can be made automatically, for instance at a voltage difference between the terminals or on the basis of an external signal supplied via terminal X. The on-board electrical system module of FIG. 5, which is composed of two field effect transistors 35, 36, a comparator 37, and a voltage supply 38, is distinguished by a bidirectional, minimal, current-dependent voltage drop in comparison with a diode. Another possibility is to use the analog switch as a parallel regulator, by varying the gate voltages. Pulse width modulation of the current with the analog switch is also possible. The analog switch may also be designed in an overload-protected form, as a result of which a further increase in the reliability is attainable.

The on-board electrical system module 22d of FIG. 5 can again be used in conjunction with a two-battery on-board electrical system of FIG. 1. It is suitable for connecting on-board electrical system branches with and without their own buffer storage devices and is also suitable in principle for connecting on-board electrical system branches without their own batteries or accumulators or capacitors. Using this kind of on-board electrical system module assures a bidirectional flow of current from terminal Kl.A to terminal Kl.B and verse versa. Only a slight voltage drop occurs, and switching through can be done at arbitrary voltages. This would not be true if diodes, bipolar transistors or thyristors were used. Since the voltage drop decreases at lower currents, even slight differences in voltage can be utilized for charging, for instance when charging from a battery via the switch. By using overload-protected analog switches, it is even possible to connect current branches having high peak currents without using power semiconductors dimensioned for that purpose.

Figure 6:
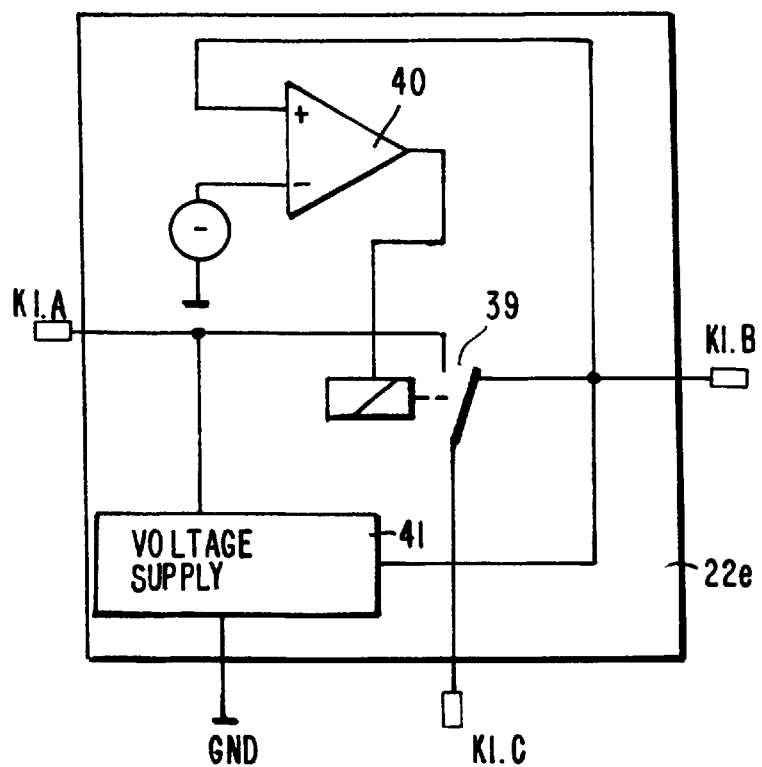

In FIG. 6, additional embodiment of on-board electrical system module 22e is shown, which has a reverse switching function. This module includes a relay 39 and a comparator 40 to whose inverting input a reference voltage is supplied while its noninverting input is connected to terminal Kl.B and can be switched to terminal Kl.A via the relay 39. In this case, the voltage supply is identified by reference numeral 41.

The variant shown in FIG. 6 of an on-board electrical system module represents an electro-mechanical reversing switch, which switches over from terminal Kl.B to terminal Kl.A if a minimum voltage of the terminal Kl.C is undershot. This variant as well can be employed in conjunction with a two-battery on-board electrical system. In that case, the consumers relevant to the operation are connected to terminal Kl.C. If a supply battery 13 which is connected to Kl.B is discharged, as evidenced by undershooting of the minimum voltage under load, for instance, or by an external control signal or some other parameter, then Kl.C is switched over from Kl.B to Kl.A. The voltage supply of the operation-relevant components is then taken over by the starter battery 18. By detecting the voltage at the supply battery, a reverse switching is thus activated, and it is thus assured that the relevant consumers are adequately well supplied.

Figure 7:
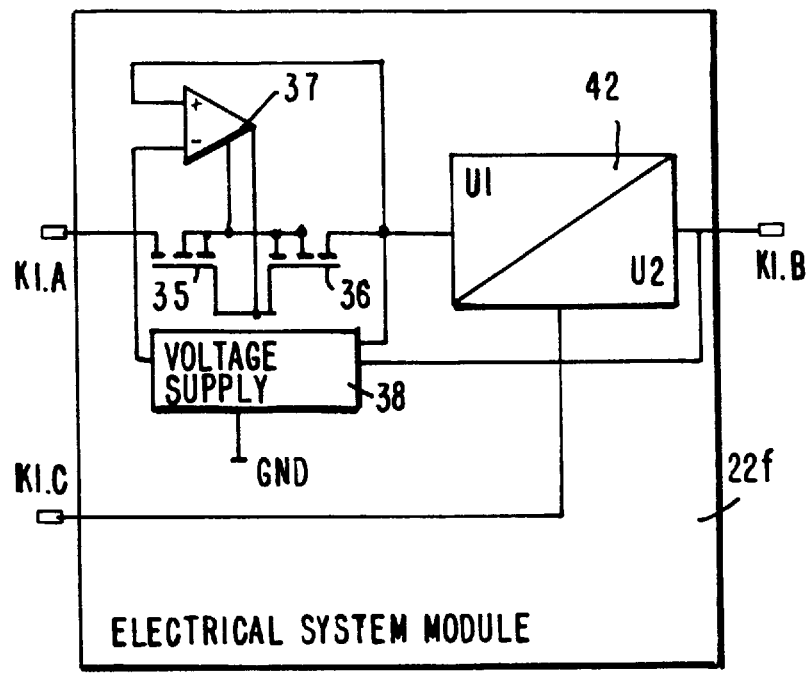

In FIG. 7, an on-board electrical system module 22f is shown, which has a combination of an analog switch and a voltage converter. This exemplary embodiment is equivalent to that of FIG. 5, with the addition of a voltage converter 42, which is connected on the one hand to terminal Kl.B and to the voltage supply 38 and on the other to the analog switch and which is additionally connected to the terminal Kl.C. With this variant, an electronic switch with a preceding voltage converter for both higher and lower voltages is realized. The voltage converter may be embodied in manifold ways, such as capacitively or inductively or unidirectionally or bidirectionally. It would be advantageous to divide the field effect transistors (MOSFETs) of the analog switch on the Kl.A and Kl.B sides from the voltage converter. The field effect transistors should then be connected on the drain sides to terminals, so that if there is a voltage difference between the voltage converter output and the terminals, their current can flow out of the converter via the diode of the field effect transistor. An additional switching-through of the field effect transistors in these phases is then appropriate, for reasons relating to power loss.

In the case where the voltage converter and the analog switch are combined, it is possible to replace the output diode of the voltage converter with the respective field effect transistor. The inverse diode in the field effect transistor is then used for this function, or the field effect transistor is switched through in the various phases. The power loss can thus be reduced. A bidirectional voltage converter can also be realized by means of one additional, ground-connected low-side switch (such as a MOSFET) and the divided analog switch, so that the respective field effect transistor replaces the output diode. Depending on the direction of conversion, one field effect transistor should be switched through and the other should be used as a diode.

Figure 8:
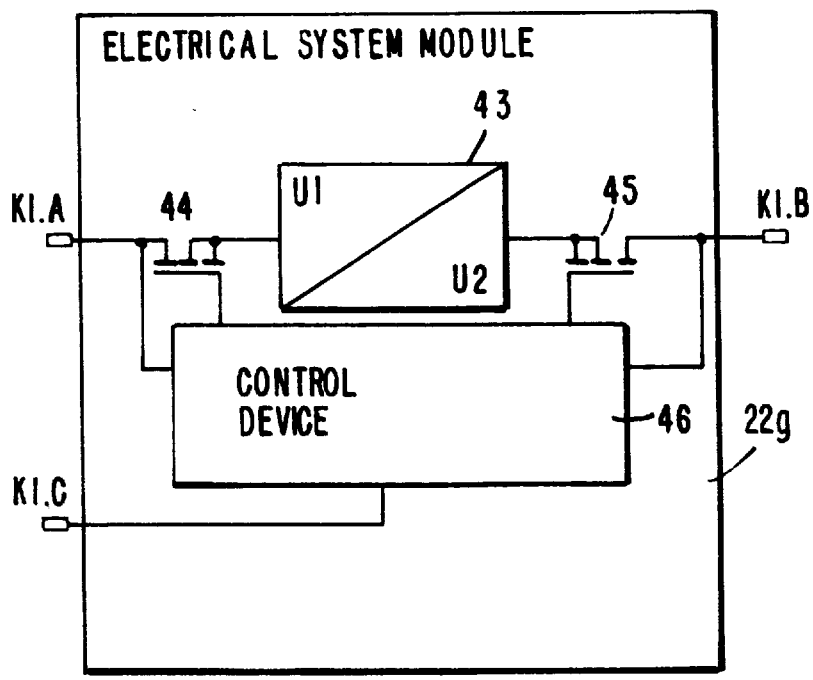

In FIG. 8, another on-board electrical system module 22g is shown, in which the voltage converter 43 is disposed between the two field effect transistors 44, 45, and an open- or closed-loop control device 46 is connected to each of the terminals Kl.A, Kl.B and Kl.C and is also connected to the field effect transistors. With such an arrangement, it is possible to connect ON-BOARD ELECTRICAL SYSTEM branches with and without their own buffer storage means (battery, accumulator, capacitor). A bidirectional current flow can be established; only a slight voltage drop occurs, and through-switching can be done at arbitrary voltages. Since the voltage drop decreases at low currents, even a small voltage difference can be utilized for charging when a battery is charged via the switch. By means of a DC/DC converter, a higher or lower voltage can be made available at the terminals. This voltage can be open- or closed-loop controlled functionally specifically by the most various parameters, for instance in conjunction with a battery temperature measurement for optimal charging of the battery.

Other configurations with serial and parallel circuits of the partial modules in the form of analog switches, reversing switches and DC/DC converters are conceivable. If bidirectional voltage converters are used in the on-board electrical system control unit, an embodiment is possible that enables the operation-relevant components even during starting from the starting battery; the voltage converter then steps up the voltage, collapsed under starting conditions, to a higher voltage, such as rated voltage. The operation-relevant components can then be designed for a narrower operating voltage range, that is, instead of to 6 to 16 V, to only 10 to 16 V.

We claim:

1. A device for supplying voltage in a motor vehicle, said device comprising supply circuit means (10) including a generator (G) having an output voltage, a first battery (13) connected electrically with the generator (G), and at least one consumer (14,15) connected electrically with the generator and the first battery (13);

starting circuit means (20) including a starter (S) and a second battery (18) connected electrically with the starter (S);

operations-relevant electrical components (21) necessary for operation of the motor vehicle including a voltage regulator connected electrically with the supply circuit means (10) for regulation of the output voltage of the generator (G);

control means (16) comprising a plurality of terminals (Kl.30, Kl.30a, Kl.30b; Kl.A, Kl.B, Kl.C) including at least one (Kl.30a, Kl.A)) of said terminals electrically connected to the starting circuit means (20), at least one other (Kl.30, Kl.B) of said terminals electrically connected to the supply circuit means (10) and at least one further one (Kl.30b, Kl.B) of said terminals for electrical connection of the operations-relevant electrical components (21) with the supply circuit means (10) or the starting circuit means (20); and an on-board electrical system module (22a–22f) including means (23, 24, 30) for reverse switching between said terminals to electrically connect and disconnect the starting circuit means (20) and the second battery (18) to said generator (G) and said first battery (13) of said supply circuit means (10) via said at least one (Kl30.A, Kl.A) of said terminals electrically connected to the starting circuit means (20) and said at least one other (Kl.30, Kl.B) of said terminals electrically connected to the supply circuit means (10) and for electrically connecting and disconnecting the operations-relevant components (21) with the supply circuit means (10) or with the starting circuit means (20) via the at least one further one of said terminals (Kl.30b, Kl.C); and means (25) for controlling the means for reverse switching between said terminals so that the operations-relevant components (21) are supplied with electrical power at a highest priority in relation to a supply of said at least one consumer (14,15) for emergency operation of the motor vehicle when both of said batteries (13,18) are in a substantially discharged or poorly charged state.

2. The device as defined in claim 1, wherein the on-board electrical system module (22a–22f) includes a DC/DC voltage converter (42,43) with a voltage input and a voltage output and one of the voltage input and the voltage output of said DC/DC voltage converter is electrically connected to the supply circuit means (10) and the operations-relevant components (21) and another of said voltage input and said voltage output of the DC/DC voltage converter is connected with the second battery (18).

3. The device as defined in claim 2, wherein said DC/DC voltage converter is bidirectional so that even during starting the operation-relevant components (21) are supplied with electrical power by the starting circuit means (20) and said DC/DC voltage converter steps up a starter voltage to a higher rated voltage.

4. The device as defined in claim 3, wherein the operation-relevant components are supplied in a narrow operating voltage range of from 10 to 16 v.

5. The device as defined in claim 2, wherein the starting circuit means (20) includes means (19) for measuring a temperature of said second battery (18) to obtain a temperature signal and means for transmitting said temperature signal to said on-board electrical system module so that said means for controlling said means for reverse switching said terminals controls said reverse switching so that said temperature of said second battery (18) determines a stepped-up voltage generated by the DC/DC voltage converter at said second battery (18) and said starter (S) during starting of the motor vehicle.

6. The device as defined in claim 1, wherein said means (23, 24; 30) for reverse switching between said terminals comprises at least one electronic switch (24) and a reversing switch (23) electrically connected between said at least one (Kl.30a, Kl.A) of said terminals and said at least one other (Kl.30, Kl.B) of said terminals, said reversing switch (23) consists of a relay and said at least one further one (Kl.30b, Kl.B) of said terminals for electrical connection of the operations-relevant electrical components is electrically connected between the electronic switch (24) and said reversing switch (23).

7. The device as defined in claim 6, wherein the on-board electrical system module (22a–22f) includes one additional terminal (Kl.50) for an external trigger signal and means (26,25) for triggering the at least one electronic switch (24) or the reversing switch (23) with said external trigger signal.

8. The device as defined in claim 1, wherein said means (25) for controlling the means for reverse switching between said terminals is a microprocessor.

9. The device as defined in claim 1, wherein said means (25) for controlling the means for reverse switching between said terminals controls said terminals so as to supply all motor vehicle components required to enable starting and subsequent operation of the vehicle for at least a predetermined time interval.

10. The device as defined in claim 1, wherein the on-board electrical system module (22a–22f) does not include a voltage converter, both of said batteries have an identical voltage rating and said means (25) for controlling the means for reverse switching between said terminals is supplied with electrical power from one of said batteries (13, 18) having a greater charge than another of said batteries.

* * * * *